(12) United States Patent
Long

(10) Patent No.: US 7,637,182 B1
(45) Date of Patent: Dec. 29, 2009

(54) DUAL FASTENER ENGAGEMENT TOOL

(76) Inventor: Vincent R. Long, 1271 Washington Ave., #821, San Leandro, CA (US) 94577

( * ) Notice: Subject to any disclaimer, the term of this patent is extended or adjusted under 35 U.S.C. 154(b) by 0 days.

(21) Appl. No.: 12/241,164

(22) Filed: Sep. 30, 2008

(51) Int. Cl.
*B25B 23/02* (2006.01)
*B25B 13/48* (2006.01)
(52) U.S. Cl. .................... 81/57.22; 81/57.36
(58) Field of Classification Search ............. 81/57.13, 81/57.22, 57.29, 57.32, 57.36, 124.4
See application file for complete search history.

(56) References Cited

U.S. PATENT DOCUMENTS

| | | | | |
|---|---|---|---|---|
| 1,536,157 A | * | 5/1925 | Slack | 81/57.22 |
| 2,482,387 A | * | 9/1949 | Veneman | 81/476 |
| 2,964,152 A | * | 12/1960 | Banner | 192/56.32 |
| 3,805,645 A | * | 4/1974 | Jenny | 81/476 |
| 3,905,254 A | | 9/1975 | Palatnick et al. | |
| 4,103,589 A | | 8/1978 | Francis | |
| 4,515,043 A | | 5/1985 | Gray | |
| 5,074,170 A | | 12/1991 | Shirley | |
| 5,218,758 A | * | 6/1993 | Nguyen | 29/837 |
| D338,146 S | | 8/1993 | Gramera | |
| 6,196,091 B1 | | 3/2001 | Khokhar et al. | |
| 6,253,644 B1 | * | 7/2001 | Duquette | 81/57.36 |
| 6,543,314 B1 | * | 4/2003 | Hoyt | 81/57.29 |
| 6,918,322 B1 | | 7/2005 | Biller | |
| 7,077,031 B1 | | 7/2006 | Frederiksen | |
| 2006/0169107 A1 | * | 8/2006 | Taniguchi et al. | 81/57.22 |

* cited by examiner

*Primary Examiner*—David B Thomas

(57) ABSTRACT

A dual fastener engagement tool includes a drive shaft engageable with a power drill. A housing includes a base section and a pair of arm sections attached to the base section. The housing includes a mounting sleeve that is rotatably attached to the base section. The drive shaft extends into the sleeve and rotates the sleeve when the power drill is actuated. A drive assembly is positioned within the housing. The drive assembly includes a pair of bolt head receivers. Each of the arm sections has one of the bolt head receivers positioned therein. The arm sections are positioned adjacent to a respective one of the distal ends of the arm sections. Each of the bolt head receivers is mechanically coupled to the sleeve and rotates when the sleeve is rotated.

5 Claims, 5 Drawing Sheets

DUAL FASTENER ENGAGEMENT TOOL

BACKGROUND OF THE INVENTION

Field of the Invention

The present invention relates to dual fastener tightening and loosening devices and more particularly pertains to a new dual fastener tightening and loosening device for allowing a person to simultaneously tighten or loosen a pair pipe clamps.

SUMMARY OF THE INVENTION

The present invention meets the needs presented above by generally comprising a drive shaft that is engageable with a power drill. A housing includes a base section and a pair of arm sections that are attached to the base section. The arm sections extend in a same direction with respect to each other and are oriented parallel to each other. The housing includes a mounting sleeve that is rotatably attached to the base section and extends an opposite direction with respect to the arm sections. The drive shaft extends into the sleeve and rotates the sleeve when the power drill is actuated. Each of the arm sections includes a distal end with respect to the central section. A drive assembly is positioned within the housing. The drive assembly includes a pair of bolt head receivers each positioned to receive one of the fasteners of a pair of pipe clamps. Each of the arm sections has one of the bolt head receivers positioned therein. The arm sections are positioned adjacent to a respective one of the distal ends of the arm sections. Each of the bolt head receivers is mechanically coupled to the sleeve and rotates when the sleeve is rotated.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
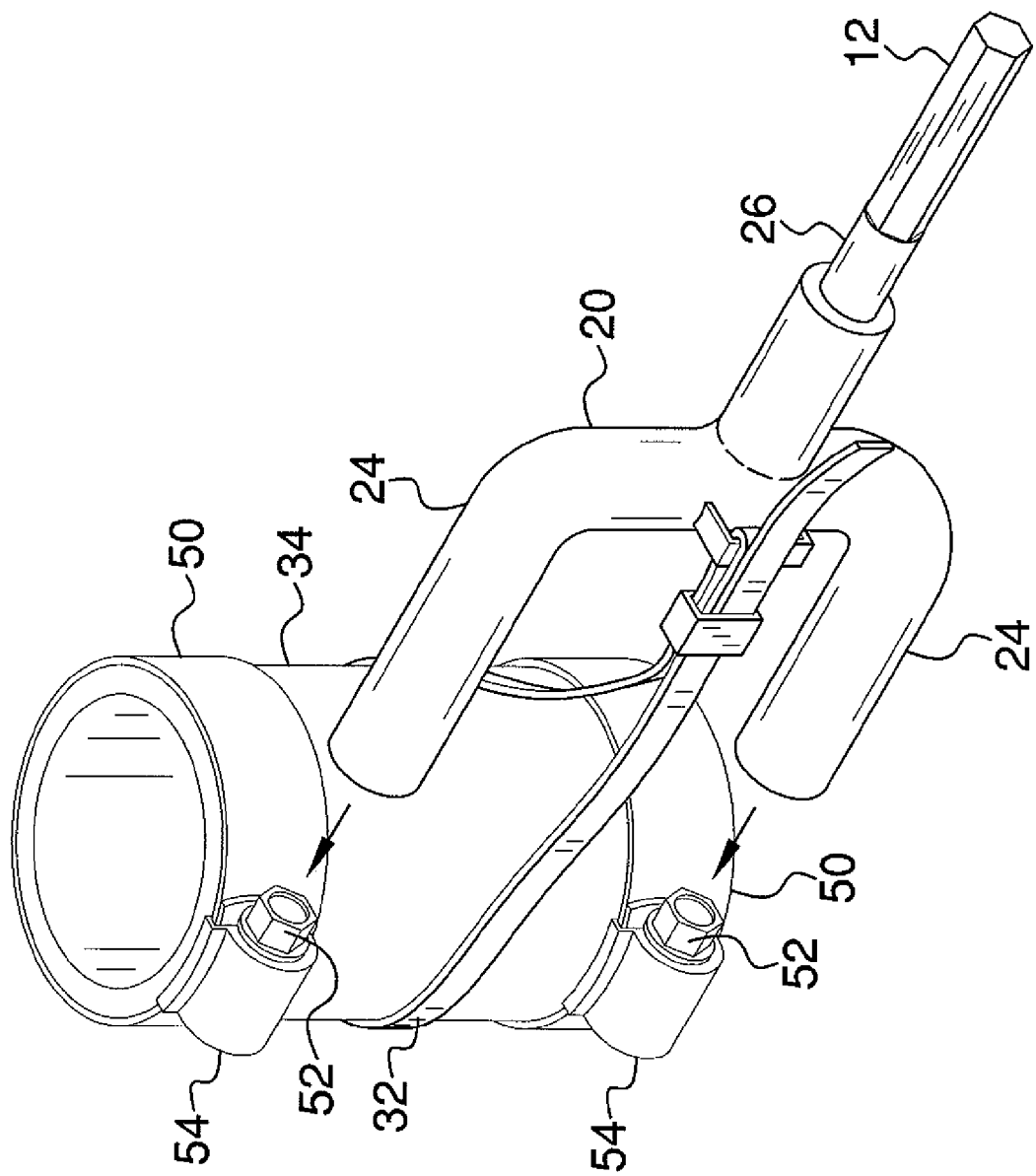
FIG. 1 is a perspective in-use view of a dual fastener engagement tool according to the present invention.
Figure 2:
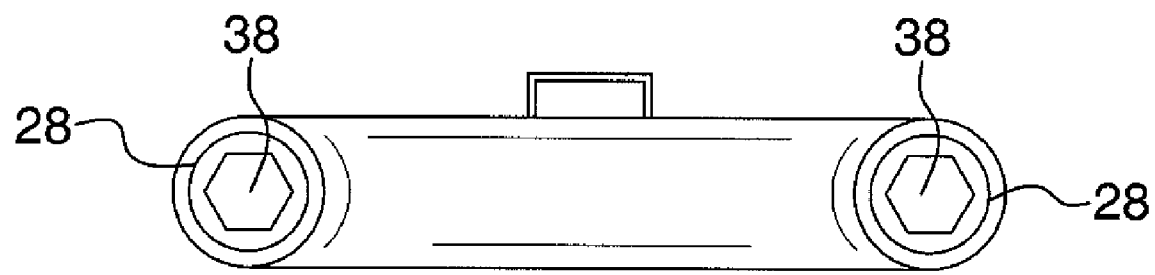
FIG. 2 is a front view of the present invention.
Figure 3:
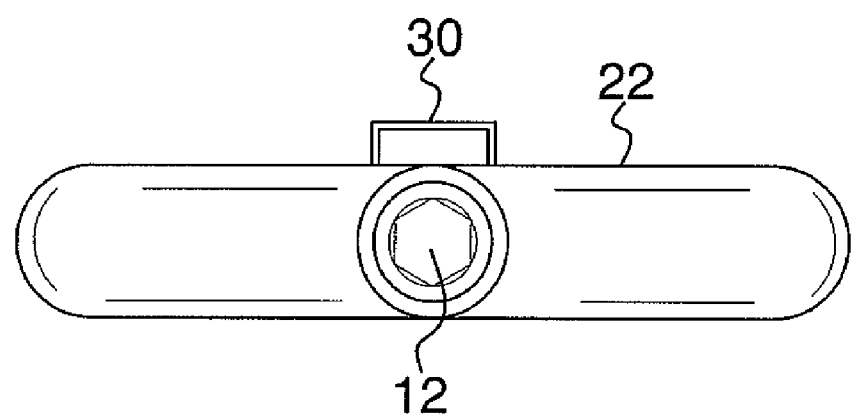
FIG. 3 is a rear view of the present invention.
Figure 4:
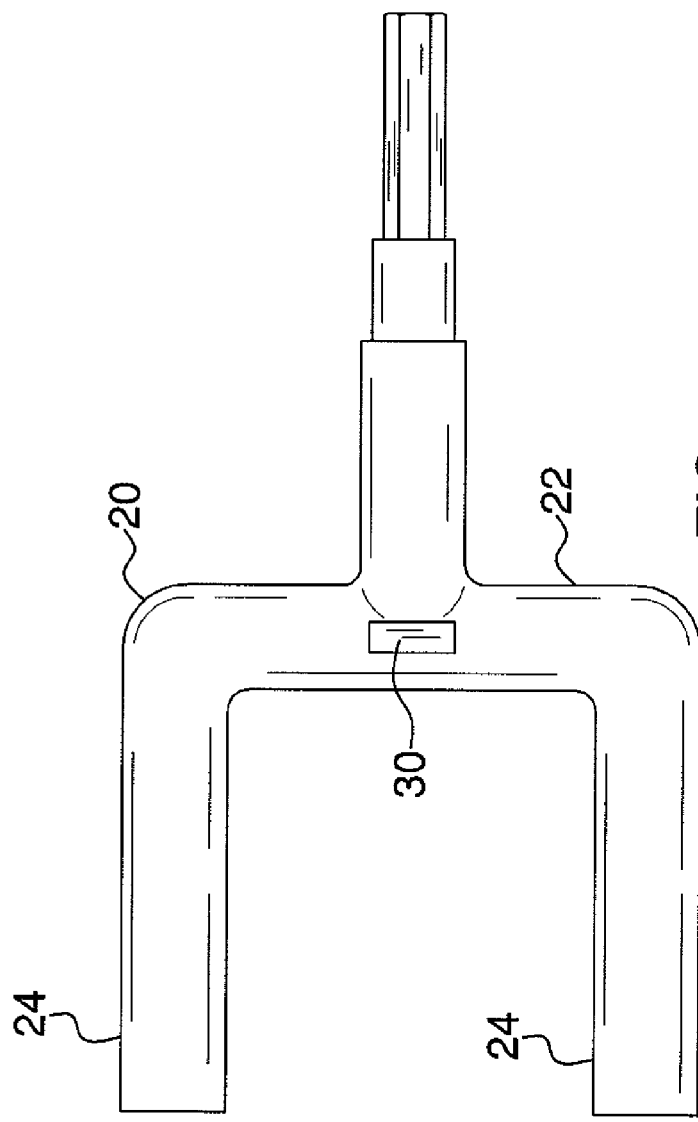
FIG. 4 is a top view of the present invention.
Figure 5:
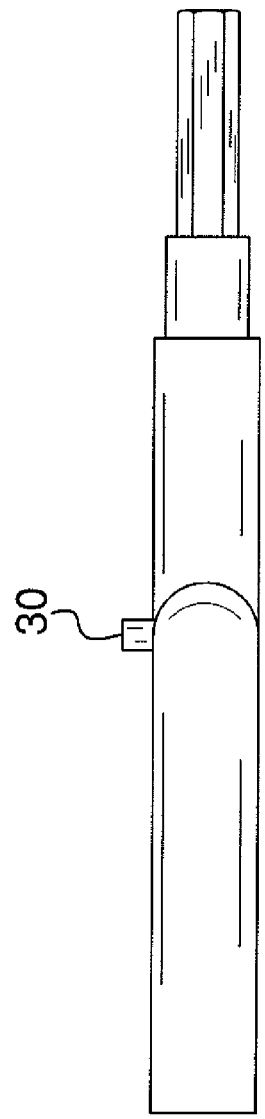
FIG. 5 is a side view of the present invention.
Figure 6:
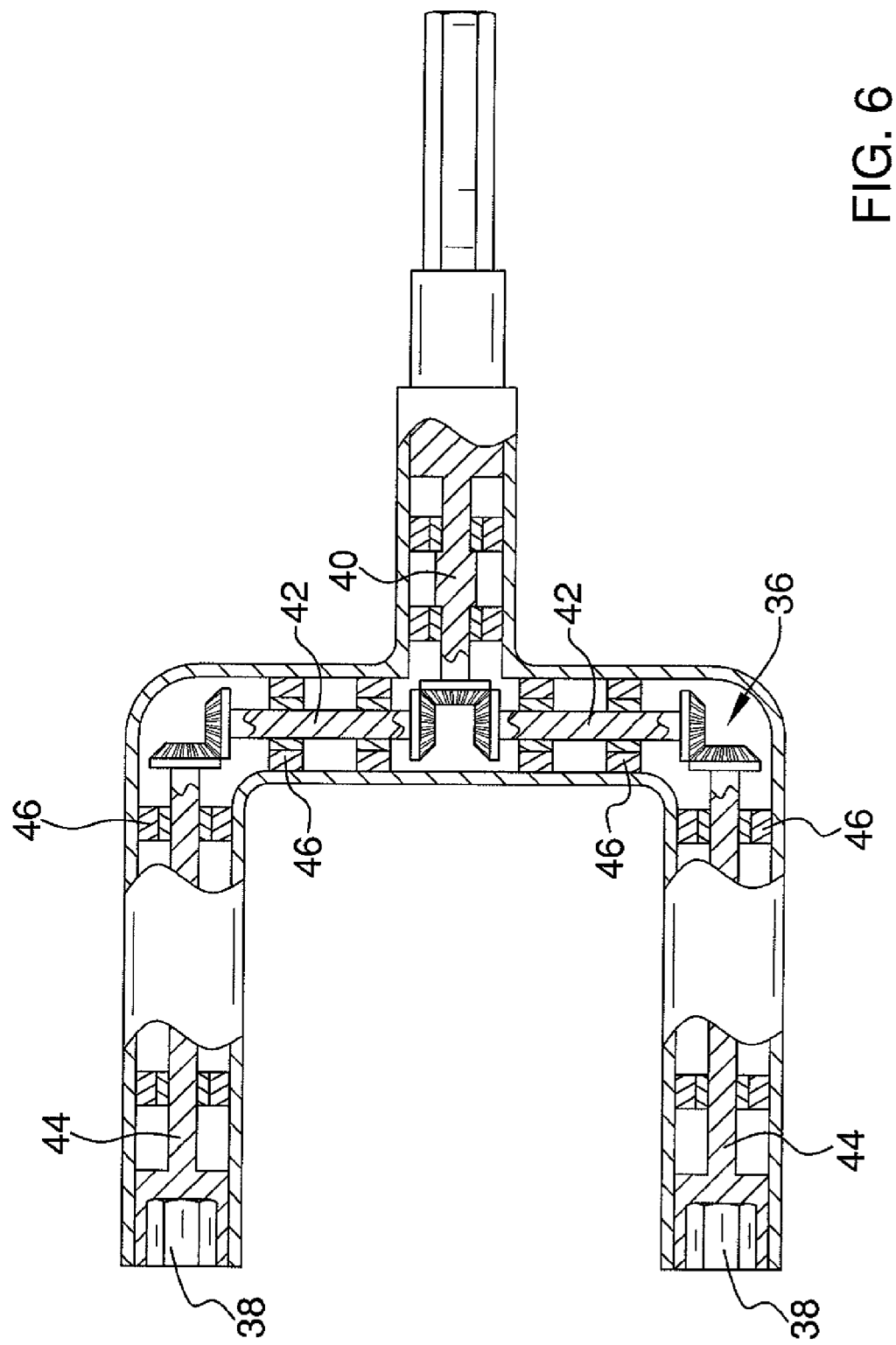
FIG. 6 is a broken bottom view of the present invention.
Figure 7:
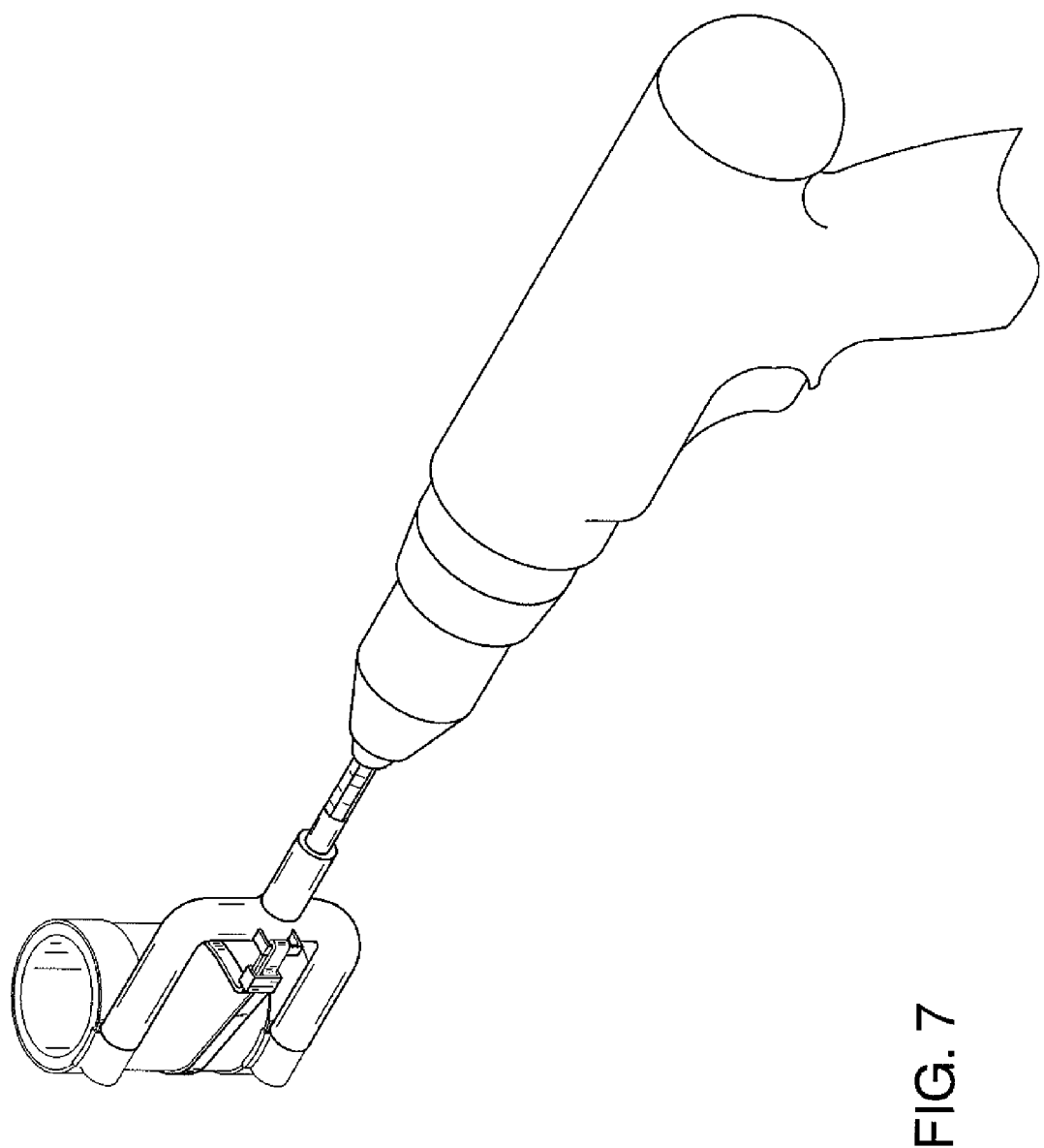
FIG. 7 is a perspective in-use view of the present invention.

With reference now to the drawings, and in particular to FIGS. 1 through 7 thereof, a new dual fastener tightening and loosening device embodying the principles and concepts of the present invention and generally designated by the reference numeral 10 will be described.

As best illustrated in FIGS. 1 through 7, the dual fastener engagement tool 10 generally comprises a drive shaft 12 that is engageable with a conventional power drill 18. A housing 20 includes a base section 22 and a pair of arm sections 24 that are attached to the base section. The arm sections 24 extend in a same direction with respect to each other and are oriented parallel to each other. The arm sections 24 extend a same distance as each other away from the base section 22. The housing 20 includes a mounting sleeve 26 that is rotatably attached to the base section 22 and extends an opposite direction with respect to the arm sections 24. The drive shaft 12 extends into the sleeve 26 and rotates the sleeve 26 when the power drill 18 is actuated. Each of the arm sections 24 includes a distal end 28 with respect to the central section. A bracket 30 is attached to the housing 20. A tether 32, such as a conventional cable tie, is extendable through the bracket 30 and around a pipe 34 to retain the housing adjacent to the pipe 34.

A drive assembly 36 is positioned within the housing 20. The drive assembly 34 includes a pair of bolt head receivers 38. Each of the arm sections 24 has one of the bolt head receivers 38 positioned therein and is positioned adjacent to a respective one of the distal ends 28 of the arm sections 24. Each of the bolt head receivers 38 is mechanically coupled to the sleeve 26 and rotates when the sleeve 26 is rotated. The bolt head receivers 38 may have any conventional shape depending on the type of fastener to be engaged. However the bolt head receivers 38 may include conventional hexagonal shaped wells.

The drive assembly 36 includes a primary shaft 40 that is attached to the sleeve 26 and extends into the central section 20. A pair of secondary shafts 42 is provided, and each of the secondary shafts 42 is mechanically engaged to the primary shaft 40. Each of the secondary shafts 42 extends into one of the arm sections 24. A pair of tertiary shafts 44 is provided. Each of the arm sections 24 has one of the tertiary shafts 44 positioned therein and each of the tertiary shafts 44 is mechanically engaged with one of the secondary shafts 42. The tertiary shafts 44 are each coupled to one of the bolt head receivers 38. The tertiary shafts 44 rotate the bolt head receivers 38 when the primary shaft 40 is rotated. A plurality of bushings 46 is mounted within the housing 20. Each of the primary 40, secondary 42 and tertiary 44 shafts extends through at least one of the bushings 46. The bushings 46 support the primary 40, secondary 42 and tertiary 44 shafts and allow each to rotate along their longitudinal axes.

In use, pipe clamps 50 are positioned where needed and the fastener heads 52 of the fasteners 54 of the pipe clamps 50 are each aligned with one of the bolt head receivers 38 so that the bolt head receivers 38 simultaneously receive both of the fastener heads 52. The fastener heads 52 are extended into the bolt head receivers 38 and the drive shaft 12 is then rotated with the drill 18 to cause both of the fasteners 54 to rotate at the same time to quickly and uniformly tighten the pipe clamps 50. The tether 32 is used to secure the housing 20 to the pipe 34 itself to prevent housing 20 from pulling away from the pipe 34 while the pipe clamps 50 are being tightened. The tether 32 may be tightened to urge the fastener heads 52 into the bolt head receivers 38 before the drive shaft 12 is rotated.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A dual fastener engagement tool apparatus simultaneously engageable with a pair of pipe clamps each including a fastener, said tool apparatus comprising:
   a drive shaft engageable with a power drill;
   a housing including a base section and a pair of arm sections being attached to said base section, said arm sections extending in a same direction with respect to each other and being oriented parallel to each other, said housing including a mounting sleeve being rotatably attached to said base section and extending an opposite direction with respect to said arm sections, said drive shaft extending into said sleeve and rotating said sleeve when the power drill is actuated, each of said arm sections including a distal end with respect to said central section;
   a drive assembly being positioned within said housing, said drive assembly including a pair of bolt head receivers each positioned to receive one of the fasteners, each of said arm sections having one of said bolt head receivers positioned therein and being positioned adjacent to a respective one of said distal ends of said arm sections, each of said bolt head receivers being mechanically coupled to said sleeve and rotating when said sleeve is rotated.

2. The apparatus according to claim 1, wherein aid drive assembly includes:
   a primary shaft being attached to said sleeve and extending into said central section;
   a pair of secondary shafts, each of said secondary shafts being mechanically engaged to said primary shaft, each of said secondary shafts extending into one of said arm sections; and
   a pair of tertiary shafts, each of said arm sections having one of said tertiary shafts positioned therein, each of said tertiary shafts being mechanically engaged with one of said secondary shafts, each of said tertiary shafts being coupled to one of said bolt head receivers, said tertiary shafts rotating said bolt head receivers when said primary shaft is rotated.

3. The apparatus according to claim 2, wherein said drive assembly further includes a plurality of bushings being mounted within said housing, each of said primary, secondary and tertiary shafts extending through at least one of said bushings.

4. The apparatus according to claim 1, further including a bracket being attached to said housing, wherein a tether is extendable through said bracket and around a pipe to retain said housing adjacent to the pipe.

5. A dual fastener engagement tool apparatus engageable simultaneously with a pair of pipe clamps each including a fastener, said tool apparatus comprising:
   a drive shaft engageable with a power drill;
   a housing including a base section and a pair of arm sections being attached to said base section, said arm sections extending in a same direction with respect to each other and being oriented parallel to each other, said arm sections extending a same distance as each other away from said base section, said housing including a mounting sleeve being rotatably attached to said base section and extending an opposite direction with respect to said arm sections, said drive shaft extending into said sleeve and rotating said sleeve when the power drill is actuated, each of said arm sections including a distal end with respect to said central section;
   a drive assembly being positioned within said housing, said drive assembly including a pair of bolt head receivers, each of said arm sections having one of said bolt head receivers positioned therein and being positioned adjacent to a respective one of said distal ends of said arm sections, each of said bolt head receivers being mechanically coupled to said sleeve and rotating when said sleeve is rotated, said drive assembly including;
   a primary shaft being attached to said sleeve and extending into said central section;
   a pair of secondary shafts, each of said secondary shafts being mechanically engaged to said primary shaft, each of said secondary shafts extending into one of said arm sections;
   a pair of tertiary shafts, each of said arm sections having one of said tertiary shafts positioned therein, each of said tertiary shafts being mechanically engaged with one of said secondary shafts, each of said tertiary shafts being coupled to one of said bolt head receivers, said tertiary shafts rotating said bolt head receivers when said primary shaft is rotated;
   a plurality of bushings being mounted within said housing, each of said primary, secondary and tertiary shafts extending through at least one of said bushings; and
   a bracket being attached to said housing, wherein a tether is extendable through said bracket and around the pipe to retain said housing adjacent to the pipe.

* * * * *